United States Patent
Browne et al.

(10) Patent No.: US 6,644,168 B1
(45) Date of Patent: Nov. 11, 2003

(54) SYSTEM AND METHOD FOR ACTIVE CONTROL OF RECOIL MECHANISM

(75) Inventors: Jerry M. Browne, Colchester, VT (US); Kenneth Wynes, Milan, IL (US); Gary Bowrey, Bettendorf, IA (US)

(73) Assignee: General Dynamics Armament and Technical Products, Inc., Falls Church, VA (US)

(*) Notice: Subject to any disclaimer, the term of this patent is extended or adjusted under 35 U.S.C. 154(b) by 4 days.

(21) Appl. No.: 10/216,688

(22) Filed: Aug. 12, 2002

(51) Int. Cl.[7] ............................................. F41A 25/00
(52) U.S. Cl. ................................. 89/42.01; 207/140.14
(58) Field of Search ............................... 89/47.01, 43.01; 267/140.14, 140.15; 188/267.1

(56) References Cited

U.S. PATENT DOCUMENTS

| | | | | |
|---|---|---|---|---|
| 3,613,730 A | * | 10/1971 | Breeden ................... | 137/625.6 |
| 3,877,347 A | * | 4/1975 | Sheesley et al. ............... | 91/438 |
| 4,153,237 A | * | 5/1979 | Supalla .................... | 267/64.15 |
| 4,296,670 A | * | 10/1981 | Northup et al. ............. | 89/43.01 |
| 4,511,022 A | * | 4/1985 | Thomas et al. ........... | 188/266.5 |
| 4,550,899 A | * | 11/1985 | Holley ........................ | 267/119 |
| 4,674,638 A | * | 6/1987 | Oliphant ..................... | 212/294 |
| 4,753,402 A | * | 6/1988 | Cole ........................... | 244/210 |
| 4,774,873 A | * | 10/1988 | Shoales ..................... | 89/43.01 |
| 4,875,402 A | * | 10/1989 | Metz .......................... | 89/43.01 |
| 4,924,751 A | * | 5/1990 | Metz et al. ................. | 89/43.01 |
| 5,227,281 A | | 7/1993 | Gaschler et al. | |
| 5,398,917 A | | 3/1995 | Carlson et al. | |
| 5,513,730 A | * | 5/1996 | Petrovich et al. ............ | 188/271 |
| 5,653,425 A | * | 8/1997 | Page et al. ................ | 267/64.15 |
| 5,662,046 A | * | 9/1997 | Wright et al. ................ | 105/167 |
| 6,019,201 A | | 2/2000 | Gordaninejad et al. | |
| 6,206,153 B1 | * | 3/2001 | Popjoy ........................ | 188/300 |
| 6,343,536 B1 | * | 2/2002 | Rossier et al. ................ | 89/161 |
| 6,386,346 B1 | * | 5/2002 | Kim et al. .................. | 188/359 |
| 6,481,669 B1 | * | 11/2002 | Griffin ..................... | 244/137.4 |

OTHER PUBLICATIONS

Khai Vu, Bob Minor, Stephen G. Floroff, and Ramon Espinosa, "Design Concept and Experimental Study of an Actively Controlled Recoil Mechanism (ACRM) on M109 155 mm Howitzer Recoil System," *U.S. Army Armament Research, Development and Engineering Center*, Contractor Report No. ARFSD–CR–89001, AD–E401 892 (May 30, 1989).

George Y. Jumper, Jr. and Stephen G. Floroff, "Feasibility of a Microprocessor Controlled Recoil Mechanism for Large Caliber Artillery Weapons," *U.S. Army Armament Research, Development and Engineering Center*, Technical Report ARLCD–TR–85007, AD–E401 338 (May 1985).

* cited by examiner

*Primary Examiner*—Charles T. Jordan
*Assistant Examiner*—Jordan M Lofdahl (57) ABSTRACT

A system and method for absorbing a recoil force in a weapon is provided. A recoil mechanism includes a housing that contains a hydraulic fluid and has an inner wall defining a first chamber and a second chamber within the housing. The inner wall has at least one orifice that connects the first and second chambers. A piston is slidably disposed within the first chamber of the housing. A shuttle valve is slidably disposed within the first chamber of the housing and has at least one orifice configured to align with the at least one orifice in the inner wall of the housing to define a fluid passageway between the first and second chambers. A shuttle valve control is operable to generate a magnetic field in response to an applied current to control the movement of the shuttle valve to thereby control the size of the fluid passageway between the first and second chambers.

33 Claims, 6 Drawing Sheets

SYSTEM AND METHOD FOR ACTIVE CONTROL OF RECOIL MECHANISM

FIELD OF THE INVENTION

The present invention relates to recoil mechanisms. More particularly, the present invention relates to a system and method for actively controlling a recoil mechanism.

BACKGROUND OF THE INVENTION

Energy absorbing devices, such as, for example, recoil devices, are commonly used in weapons to dissipate the recoil energy created during the firing of a round. A weapon creates recoil energy when a propellant contained within the round is ignited. The burning of the propellant generates high pressure gases between a projectile and a recoiling portion of the weapon. The high pressure gasses exert a force on both the projectile and the recoiling portion of the weapon, which causes the recoiling portion of the weapon to move in the opposite direction of the projectile.

An energy absorbing device may be connected between the recoiling portion and a support carriage to dissipate the recoil energy as the recoiling portion travels through a certain recoil distance. The energy absorbing device may exert a force that counters the movement of the recoiling portion to thereby dissipate the recoil energy. Ideally, the energy absorbing device will exert a substantially constant force to oppose the movement of the recoiling portion. An ideal plot of the countering force as a function of time will have a generally trapezoidal shape, i.e. the the majority of the recoil travel, and the countering force will quickly subside at the end of the recoil travel. This force profile will maximize the amount of energy dissipated while minimizing the magnitude of the force transferred to the supporting carriage of the weapon. Accordingly, the weight of the supporting carriage, and thus the overall weight of the weapon, may be minimized.

An energy absorbing device may include a hydraulic system that absorbs the recoil energy of the fired round. The hydraulic system may include a piston and cylinder combination that absorbs the recoil energy by throttling hydraulic fluid from a high pressure chamber through one or more orifices to a low pressure chamber. The force required to throttle the fluid through the orifices counters the movement of the piston. The magnitude of the countering force is dependent, in part, on the size of the orifices. The orifices are typically sized to ensure that the recoil energy is dissipated as the recoiling portion travels through a predetermined distance.

In a hydraulic recoil system, the amount and rate of recoil energy dissipation is dependent upon many factors. For example, the dissipation rate is dependent upon the velocity of the recoil portion of the weapon, the properties of the hydraulic fluid, and the sizes of the piston and corresponding orifices. However, the recoil energy generated by a fired round is also dependent upon many factors, including, for example, the type of round fired, the propellant charge in the round, the climatic conditions, the wear on the weapon, and the position of the weapon. Typically, hydraulic recoil devices are designed to dissipate the greatest expected amount of recoil energy, such as would be experienced when firing a round of the greatest impulse ammunition for the particular weapon.

A hydraulic recoil device may be designed to generate a trapezoidal force profile when subjected to one amount of recoil energy. However, the hydraulic recoil device may behave differently when subjected to a lesser, or greater, amount of recoil energy. When subjected to an unexpected amount of recoil energy, a hydraulic recoil system with a fixed configuration may not provide a trapezoidal shaped force profile.

It would be desirable to provide a recoil device capable of responding to varying conditions, such as differing amounts of recoil energy, when the weapon is in the field. Various control schemes have been proposed and tried with varying degrees of success. For example, a hydraulic recoil device may be equipped with a mechanical servo valve that controls the size of the orifices between the high and low pressure chambers. This mechanical servo valve may be actively controlled to vary the size of the orifices based on sensed operating conditions of the weapon, such as gun dynamics and ambient conditions. This type of active control device may allow the countering force of the recoil mechanism to be tailored to suit the particular operating conditions.

However, to achieve an ideal force profile, the active control system should quickly respond to changes in either gun dynamics or ambient conditions. Unfortunately, the mechanical servo valves described above may not be responsive enough to changing operating conditions. This may lead to erratic performance of

SUMMARY OF THE INVENTION

The present invention is directed to a recoil mechanism that provides active control over the magnitude and rate of energy dissipation to quickly respond to changing conditions and to generate an ideal countering force profile.

Accordingly, the present invention is directed to a recoil mechanism that compensates for one or more of the limitations and disadvantages of prior art recoil mechanisms. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

In accordance with one aspect, the present invention is directed to a recoil mechanism for a weapon. The recoil mechanism includes a housing that contains a hydraulic fluid and has an inner wall defining a first chamber and a second chamber within the housing. The inner wall has at least one orifice that connects the first and second chambers. A piston is slidably disposed within the first chamber of the housing. A shuttle valve is slidably disposed within the first chamber of the housing and has at least one orifice configured to align with the at least one orifice in the inner wall of the housing to define a fluid passageway between the first and second chambers. A shuttle valve control is operable to generate a magnetic field in response to an applied current to control the movement of the shuttle valve to thereby control the size of the fluid passageway between the first and second In accordance with another aspect, the present invention is directed to a recoil mechanism for a weapon that includes a housing containing a hydraulic fluid and having an inner wall defining a first chamber and a second chamber within the housing. The inner wall has at least one orifice that connects the first and second chambers. A piston is slidably disposed within the first chamber of the housing. A shuttle valve is slidably disposed within the first chamber of the housing and has at least one orifice configured to align with the at least one orifice in the inner wall of the housing to define a fluid passageway between the first and second chambers. A control means generates a magnetic field to control the movement of the shuttle valve in response to an applied current to thereby control the size of the fluid passageway between the first and second chambers.

According to another aspect, the present invention is directed to a weapon that includes a support carriage and a barrel assembly that is slidably disposed on the support carriage. A recoil device is disposed between the support carriage and the barrel assembly. The recoil device includes a housing that contains a hydraulic fluid and has an inner wall defining a first chamber and a second chamber within the housing. The inner wall has at least one orifice that connects the first and second chambers. A piston is slidably disposed within the first chamber of the housing. A shuttle valve is slidably disposed within the first chamber of the housing and has at least one orifice configured to align with the at least one orifice in the inner wall of the housing to define a fluid passageway between the first and second chambers. A shuttle valve control is operable to generate a magnetic field in response to an applied current to govern the movement of the shuttle valve and thereby control the size of the fluid passageway between the first and second chambers.

In yet another aspect, the present invention is directed to a method of absorbing a recoil momentum generated by a weapon. A fluid pressurized by the momentum of the piston is throttled through a fluid passageway connecting the first chamber of the housing with a second chamber in the housing to exert a fluid force against the motion of the piston. An operating condition of the weapon is sensed. A magnetic field is generated to control the motion of a shuttle valve based on the sensed operating condition. The motion of the shuttle valve varies the size of the fluid passageway between the first and second chambers to provide control over the magnitude of the fluid force exerted on the piston.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the present invention and together with the description, serve to explain the principles of the

DESCRIPTION OF THE EMBODIMENTS

Reference will now be made in detail to embodiments of the invention, an example of which is illustrated in the accompanying drawings. Wherever possible, the same reference numbers will be used throughout the drawings to refer to the same or like parts.

Figure 1:
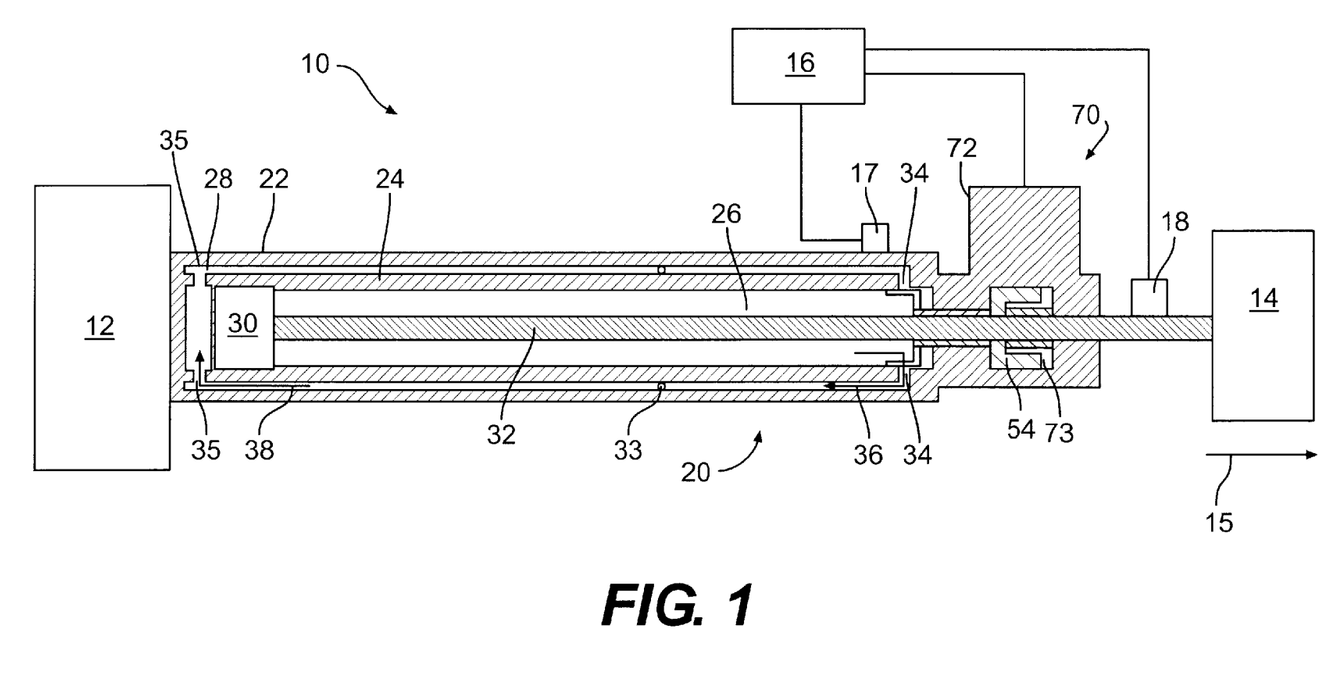
FIG. 1 s a schematic and diagrammatic illustration of a weapon having a recoil mechanism in accordance with an exemplary embodiment of the present invention.

An exemplary embodiment of a weapon having a recoil mechanism in accordance with the present invention is schematically and diagrammatically illustrated in FIG. 1. The weapon, which is generally designated as reference number 10, may be any device configured to fire a round of ammunition. Preferably, weapon 10 is configured to fire large caliber ammunition, such as, for example, a howitzer. One skilled in the art may recognize, however, that the principles of the present invention may apply to other types of energy absorbing devices.

As schematically illustrated in FIG. 1, weapon 10 includes a barrel assembly 14. Barrel assembly 14 is disposed on a support carriage 12 for sliding movement between a forward position and a rearward position. Barrel assembly 14 is configured to fire a round of ammunition. The ignition of the propellant during the firing of the round of ammunition generates a recoil momentum that acts to move barrel assembly 14 from the forward position to the rearward position relative to support carriage 12. In the exemplary illustrated embodiment, the recoil momentum acts to move barrel assembly 14 in the direction of arrow 15.

In accordance with the present invention, a recoil mechanism 20 is disposed between barrel assembly 14 and support carriage 12. Recoil mechanism 20 is configured to absorb the recoil energy generated by the fired round of ammunition. Preferably, recoil mechanism 20 absorbs the recoil energy when barrel assembly 14 travels through a predetermined recoil distance.

Figure 2:
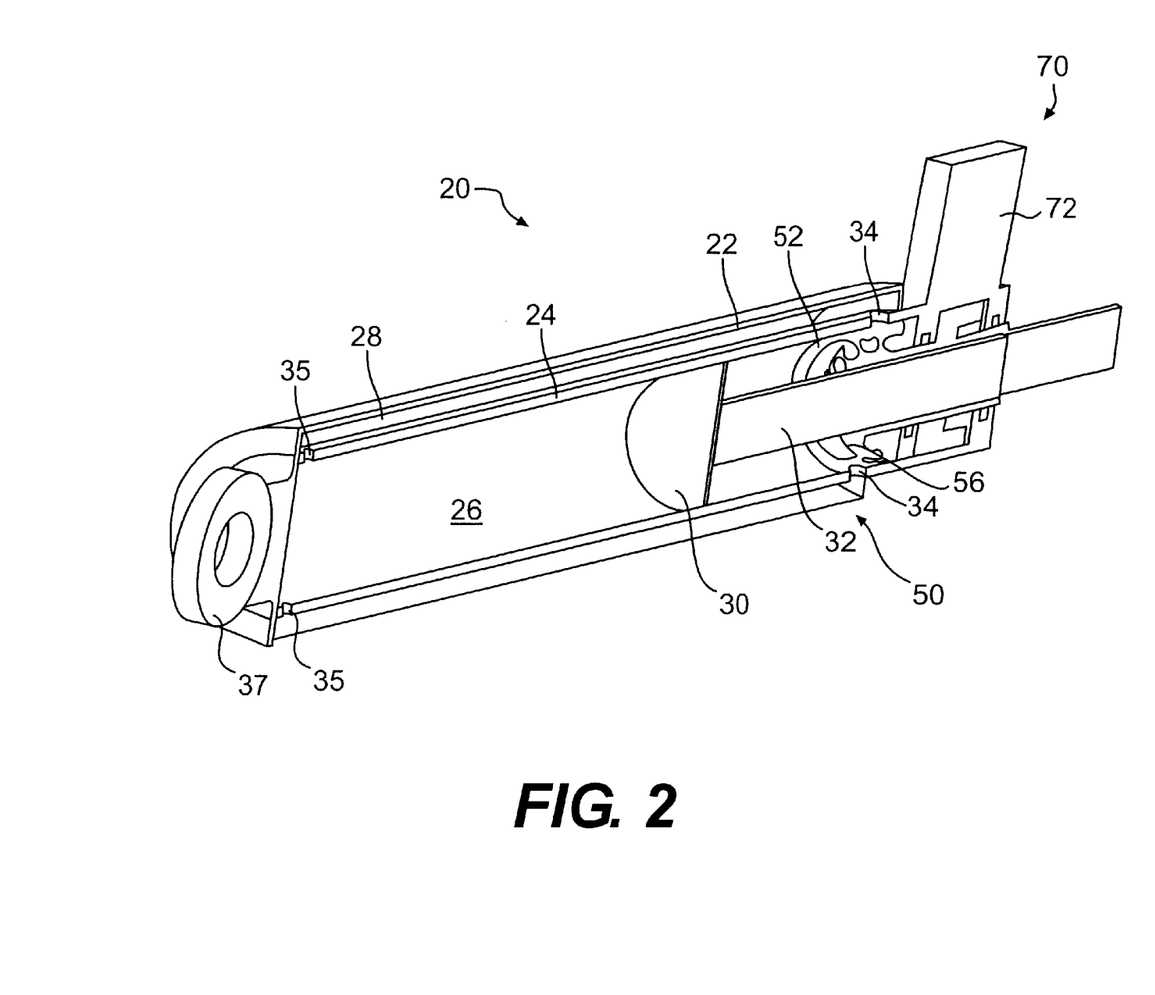
FIG. 2 is a cut-away sectional view of a recoil mechanism in accordance with an exemplary embodiment of the present invention.

As shown in FIGS. 1 and 2, recoil mechanism 20 includes a housing 22. Housing 22 may be connected to support carriage 12 of weapon 10. As shown in FIG. 2, housing 22 may include an attachment clevis 37 to provide the connection with support carriage 12. It should be understood, however, that housing 22 may be connected to support carriage 12 in any manner readily apparent to one skilled in the art. In addition, housing 22 may be connected to barrel assembly 14.

An inner wall 24 is disposed within housing 22 and divides housing 22 into a first chamber 26 and a second chamber 28. Inner wall 24 includes a series of orifices 34 and 35 between the first and second chambers 26, 28. A hydraulic fluid, such as, for example, oil, is stored within both first chamber 26 and second chamber 28.

A piston 30 is slidably disposed within inner wall 24. In the exemplary illustrated embodiment, a piston rod 32 connects piston 30 with barrel assembly 14. It should be understood, however, that piston rod 32 may connect piston 30 with support carriage 12.

In response to the firing of a round of ammunition, barrel assembly 14 and piston 30 will move in the direction indicated by arrow 15 relative to support carriage 12 and housing 22. The fluid confined between moving barrel piston 30 and throttling orifices 34 is pressurized. This pressure acting on piston 30 effects a recoil force that acts to retard the motion of barrel assembly 14. The pressurized fluid is throttled through orifices 34 to second chamber 28 (as indicated by arrow 36 in FIG. 1). Fluid also flows from second chamber 28 to first chamber 26 through orifices 35 at the opposite end of housing 22 (as indicated by arrow 38 in FIG. 1).

In an alternative embodiment, a second piston 33 may be disposed in second chamber 28. Second piston 33 may separate the hydraulic fluid from a gas. The introduction of fluid into second chamber 28, will act on second piston 33 to compress the gas on the opposite side of piston. In this embodiment, the orifices 35 sat the opposite end of housing 22 are closed. In this manner, some of the recoil energy of the moving piston 30 may be stored as pressurized gas.

The throttling of the fluid through orifices 34 dissipates the recoil energy of the fired round. A force is required to force fluid through orifices 34. The magnitude of the force is dependent upon several factors, including, for example, the size of orifices 34 and the properties of the hydraulic fluid. Preferably, orifices 34 are sized such that the recoil energy is dissipated as barrel assembly 14 travels through a predetermined recoil distance.

In accordance with the present invention, a shuttle valve is provided to vary the magnitude of the force required to throttle fluid between the first and second chambers. The shuttle valve includes a series of orifices that align with the orifices in the inner wall and form at least one fluid passageway between the first and second chambers. The shuttle valve is moveable to alter the alignment of the orifices and thereby change the size of the fluid passageway. A means for controlling the movement of the shuttle valve is provided to control the relative position of the shuttle valve and tailor the size of the fluid passageway to the operating conditions of the weapon.

Figure 3:
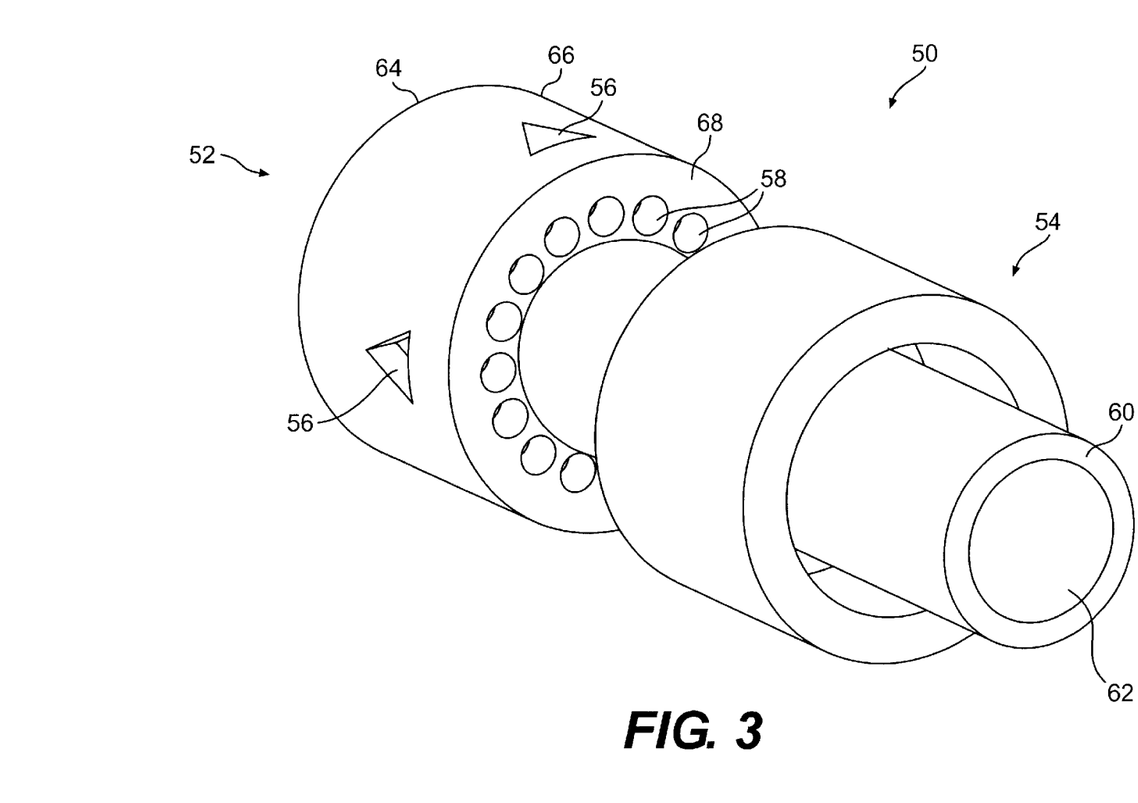
FIG. 3 is a pictorial illustration of a shuttle valve in accordance with an exemplary embodiment of the present invention.

An exemplary embodiment of a shuttle valve 50 is illustrated in FIG. 3. Shuttle valve 50 includes a valve portion 52 and a control portion 54. A connecting portion 60 joins valve portion 52 with control portion 54. Connecting portion 60 includes a central opening 62 that extends through shuttle valve 50.

Figure 4A:
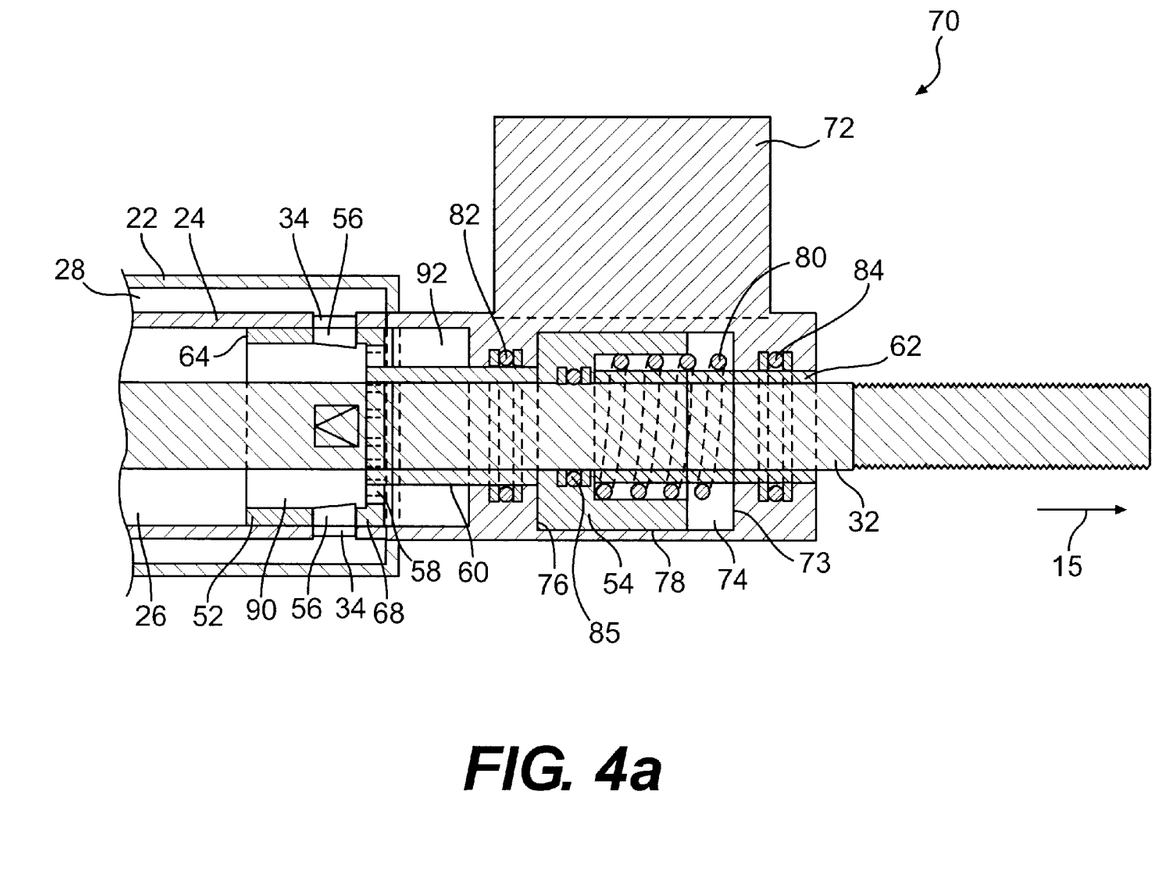
FIG. 4a is a perspective view of a recoil mechanism in accordance with an exemplary embodiment of the present invention, illustrating the shuttle valve in a first position.

In the exemplary embodiment illustrated in FIG. 3, valve portion 52 has a cup shape formed by a lip 64, a wall 66, and an end portion 68. Wall 66 defines a first series of orifices 56. End portion 68 defines a second series of orifices 58. As shown in FIG. 4a, wall 66 defines a cavity 90 that is exposed to fluid within first chamber 26.

Figure 4B:
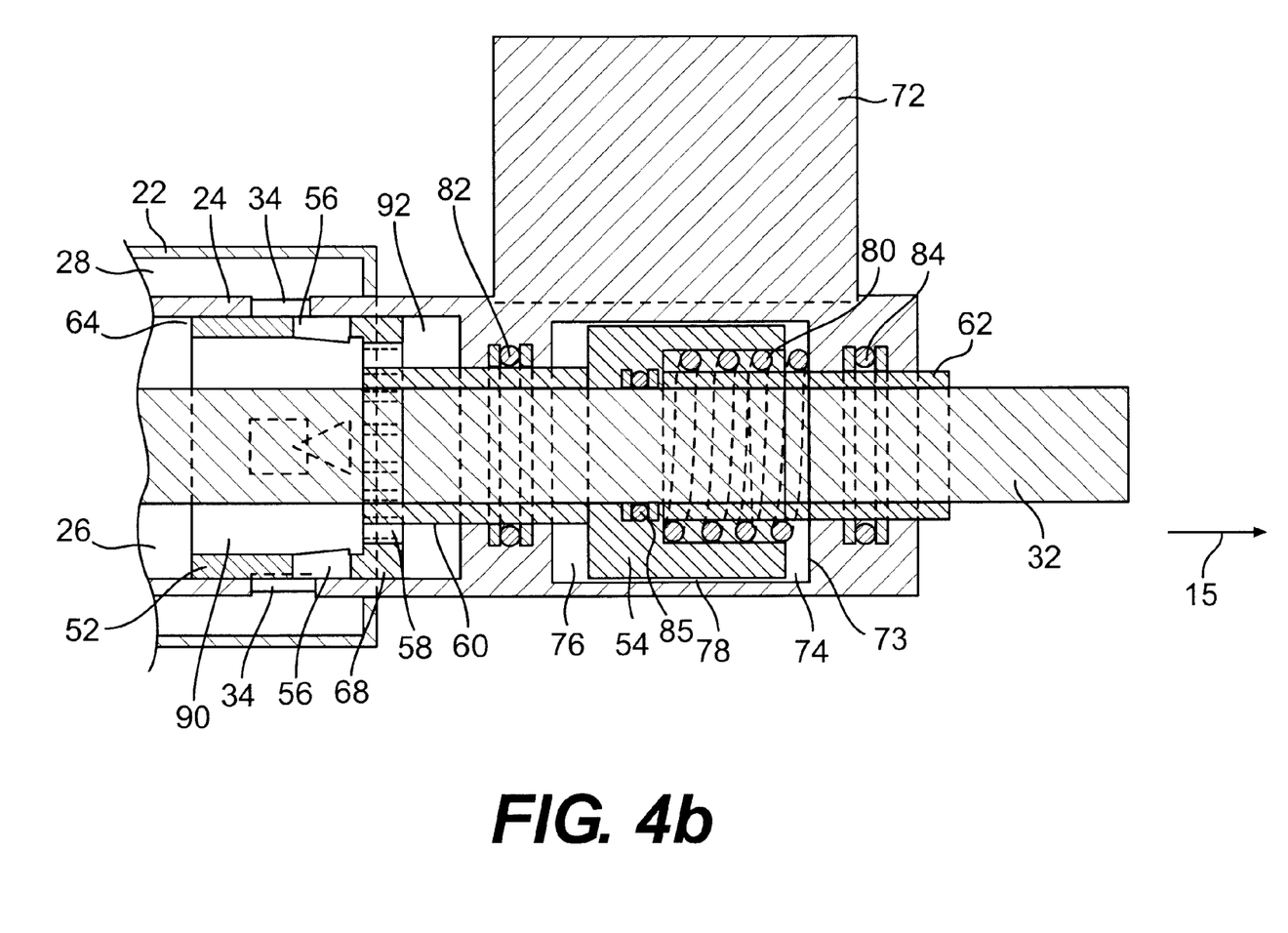
FIG. 4b is a cross-sectional view of a recoil mechanism in accordance with an exemplary embodiment of the present invention, illustrating the shuttle valve in a second position.

As illustrated in FIGS. 4a, and 4b, valve portion 52 of shuttle valve 50 is disposed within first chamber 26 of housing 22. End portion 68 of valve portion 52 forms an additional cavity 92 within inner wall 24. The additional cavity 92 is exposed to fluid within first chamber 26 through orifices 58 and cavity 90 of valve portion 52.

When piston 30 advances relative to housing 22 and pressurizes the fluid within first chamber 26, the pressurized fluid exerts a force on valve portion 52 of shuttle valve 50. The magnitude of the exerted force is dependent upon the pressure of the fluid within first chamber 26 and the amount of surface area of lip 64 and end portion 68 exposed to the pressurized fluid. The magnitude of the force may therefore be varied by increasing or decreasing the size and/or number of orifices 58 in end portion 68.

As also shown in FIGS. 4a and 4b, central opening 62 receives piston rod 32. Shuttle valve 50 may slide relative to inner wall 24 and piston rod 32 may slide relative to shuttle valve 50. It should be noted, however, that various different configurations may be readily apparent to one skilled in the art. For example, piston rod 32 may extend around first chamber 26 and around shuttle valve 50 instead of through first chamber 26 and through shuttle valve 50.

Orifices 56 of valve portion 52 are configured to generally align with orifices 34 of inner wall 24 to form a fluid passageway between first chamber 26 and second chamber 28. A movement of shuttle valve 50 relative to housing 22 may vary the size of the fluid passageway. As shown in FIG. 4a, when shuttle valve 50 is in a first position, orifices 56 substantially align with orifices 24 to maximize the size of the fluid passageway between first and second chambers 26 and 28. As shown in FIG. 4b, when shuttle valve 50 moves to a second position, orifices 56 move relative to orifices 24 to minimize the size of the fluid passageway between first and second chambers 26 and 28.

As also shown in FIG. 4a, control portion 54 of shuttle valve 50 is disposed within a third chamber 73. Third chamber 73 may be formed as part of housing 22, inner wall 24, or as a separate unit that is attachable to housing 22. A first cavity 74 and a second cavity 76 are formed on either side of control portion 54. A third cavity 78 extends around control portion 54 and connects first cavity 74 and second cavity 76. Preferably, control portion 54 is made of a magnetic material, such as, for example, iron or steel.

In the currently contemplated embodiment, third chamber 73 includes a rheological fluid, such as, for example, a magneto-rheological fluid. The properties of the rheological fluid may be altered by applying an external stimulus, such as, for example, a magnetic field, to the rheological fluid. In the case of a magneto-rheological fluid, the application of a magnetic field to the fluid will increase the effective viscosity of the fluid.

As also shown in FIGS. 4a and 4b, a spring 80 may be positioned in third chamber 73 to act on control portion 54 of shuttle valve 50. Spring 80 may act to bias shuttle valve 50 into the first position, where the size of the fluid passageway between first and second chambers 26 and 28 is maximized. It is contemplated, however, that spring 80 may act on another portion of shuttle valve 50.

A first seal 82 and a second seal 84 may disposed in housing 22. First seal 82 engages shuttle valve 50 to prevent fluid from leaking between first chamber 26 and third chamber 73. Second seal 84 engages shuttle valve 50 to prevent fluid from escaping housing 22 from third chamber 73. A third seal 85 may be included to prevent fluid from chamber 26 leaking out between rod 32 and shuttle valve portion 60.

As shown in FIG. 4a, a shuttle valve control 70 is provided. Shuttle valve control 70 includes a magnetic field generating device 72. In the currently contemplated embodiment, magnetic field generating device 72 is an electromagnet. It is contemplated, however, that various other types of devices may be used, such as, for example, a solenoid or other magnetic field generator.

As illustrated in FIG. 1, a controller 16 is connected to magnetic field generating device 72. Controller 16 may include a microprocessor and a memory. As is known to those skilled in the art, the memory is connected to the microprocessor and stores an instruction set and variables. Controller 16 may further include various other known circuits such as, for example, power supply circuitry, signal conditioning circuitry, and solenoid driver circuitry, among others.

As shown in FIG. 1, recoil mechanism 20 may include a sensor 17. Sensor 17 is configured to sense an operating parameter of the recoil mechanism 20 that is indicative of the force exerted by piston 30 on the fluid within first chamber 26. In the currently contemplated embodiment, sensor 17 is a pressure sensor that is configured to directly sense the pressure of the fluid within first chamber 26.

It is contemplated, however, that additional or different sensors may be used to sense alternative operating parameters that are indicative of the force exerted by piston 30 on the fluid within first chamber 26. For example, as illustrated in FIG. 1, a sensor 18 may be configured to sense the velocity and/or acceleration of piston rod 32, or any part of barrel assembly 14. Based on the velocity and/or acceleration of piston rod 32, controller 16 may be able to determine the pressure of the fluid within first chamber 26. Other alternatives, such as, for example, sensing the flow rate of fluid through the fluid passageway, may be readily apparent to one skilled in the art.

The operation of the above-described device will now be described with reference to the drawings.

A recoil momentum is generated when weapon 10 fires a round of ammunition. The recoil momentum acts on barrel assembly 14, and attached piston 30, to move barrel assembly 14 in the direction of arrow 15. The recoil momentum is transferred through piston 30 to the fluid within first chamber 26.

The fluid within first chamber 26 is throttled through the fluid passageway formed by orifices 34 of inner wall 24 and orifices 56 in shuttle valve 50. The throttling of the fluid through the fluid passageway exerts a countering force on piston 30 that opposes the recoil momentum. The magnitude of the force is dependent on the size of the fluid passageway. For a given flow velocity from first chamber 26, a smaller fluid passageway will result in a high pressure force exerted on piston 30 than will a larger fluid passageway.

The location of shuttle valve 50 relative to inner wall 24 controls the size of the fluid passageway connecting first and second chambers 26 and 28. A movement of shuttle valve 50 from the first position (as illustrated in FIG. 4a) towards the second position (as illustrated in FIG. 4b) will decrease the size of the fluid passageway. A movement of shuttle valve 50 from the second position (as illustrated in FIG. 4b) towards the first position (as illustrated in FIG. 4a) will increase the size of the fluid passageway.

The momentum of piston 30 acts to pressurize the fluid in first chamber 26, which exerts a first force ($F_1$) on shuttle valve 50. The first force ($F_1$) acts to move shuttle valve 50 towards the second position. The magnitude of the first force ($F_1$) may be given by the following formula:

$$F_1 = A_1 P_1 - A_2 P_2$$

where $A_1$ is the combined axial surface area of lip 64 and end portion 68 that is exposed to the pressurized fluid in first chamber 26; $P_1$ is the pressure of the fluid in first chamber 26; $A_2$ is the surface area of end portion exposed to fluid in cavity 92; and $P_2$ is the pressure of the fluid in cavity 92. The pressure differential $P_1 - P_2$ will depend on the flow conditions established through orifices 58. If orifices 58 are sized to allow a sufficient flow of fluid and areas $A_1$ and $A_2$ are substantially equal, a high pressure of fluid in first chamber 26 will result in a well defined but minimal force, $F_1$, that acts to move shuttle valve 50 towards the second position.

The motion of shuttle valve 50 may be controlled by applying a second force ($F_2$) to control portion 54 to oppose the first force ($F_1$). Controller 16 may control the magnitude of the second force ($F_2$) to control the movement of shuttle valve 50 and, thus, the size of the fluid passageway between first and second passageways 26 and 28. In the currently contemplated embodiment, the second force ($F_2$) includes a magnetic component, a viscous component, and a fluid flow, or Bernoulli, component and may be defined as:

$$F_2 = F_{Magnetic} + F_{viscous} + F_{Bernoulli}$$

The magnetic component, $F_{Magnetic}$, may be given by the following formula:

$$F_{Magnetic} = \tau \frac{3LA_p}{d}$$

where $\tau$ is the magnetic field dependent yield stress; L is the length of control portion 54; $A_p$ is the magnetic flux-return cross-sectional area of control portion 54; and d is the width of third cavity 78.

The viscous component, $F_{viscous}$, may be given by the following formula:

$$F_{Viscous} = \mu \frac{12LA_p^2}{A_d d^2} U$$

where $\mu$ is the viscosity of the fluid within third chamber 73; L is the length of control portion 54; $A_p$ is the magnetic flux-return cross-sectional area of control portion 54; $A_d$ is the cross-sectional area of third cavity 78; d is the width of third cavity 78; and U is the velocity of shuttle valve 50 relative to housing 22.

The Bernoulli component, $F_{Bernoulli}$, may be given by the following formula:

$$F_{Bernoulli} = \rho \frac{A_p^3}{2C^2 A_d^2} U^2$$

where $\rho$ is the density of the fluid in third chamber 73; $A_p$ is the magnetic flux-return cross-sectional area of control portion 54; C is the discharge coefficient of third cavity 78; $A_d$ is the cross-sectional area of third cavity 78; and U is the velocity of shuttle valve 50 relative to housing 22.

Controller 16 may vary the magnitude of the second force ($F_2$) by varying the magnitude of an electrical current applied to shuttle valve control 50. In the currently contemplated embodiment, the application of the electrical current results in the generation of a magnetic field. By varying the current applied to shuttle valve control 50, the strength of the magnetic field may be similarly varied. A variation in the magnetic field may result in a change in the magnetic component ($F_{Magnetic}$) of the second force ($F_2$).

The magnetic component ($F_{Magnetic}$) of the second force ($F_2$) represents an increased resistance to fluid flow in third cavity 78. This resistance results when magnetic particles in the magneto-rheological fluid align themselves as if to form a uniform magnet chain that resists the shearing apart of this magnetic chain. The strength of the magnet chain, and the amount of resistance to fluid flow in third cavity 78, will depend of the localized strength of the magnetic field experienced within the fluid in third cavity 78. The increased resistance to fluid flow within third cavity 78 acts to prevent control portion 54 from moving within third cavity 78. Thus, increasing the strength of the magnetic field will act to prevent shuttle valve 50 from moving from its current position.

The viscous component ($F_{viscous}$) represents the force of the fluid within third chamber 73 on control portion 54 as control portion moves within third chamber 73. An increase in the strength of the magnetic field may increase the effective viscosity of the rheological fluid within third chamber 73. An increase in the effective viscosity of the Theological fluid will act to retard the motion of control portion 54 relative to housing 22.

Controller 16 will adjust the magnitude of the electrical current applied to shuttle valve control 50 to control the magnitude of the second force ($F_2$) based on the magnitude of the first force ($F_1$). By adjusting the magnitude of the second force ($F_2$) to be equal to or less than the first force ($F_1$), controller may control the movement of shuttle valve 50 from the first position towards the second position. In this manner, controller 16 may thereby control the size of the fluid passageway between first and second chamber 26 and 28 and, thus, the magnitude of the fluid force exerted on piston 30.

Figure 5:
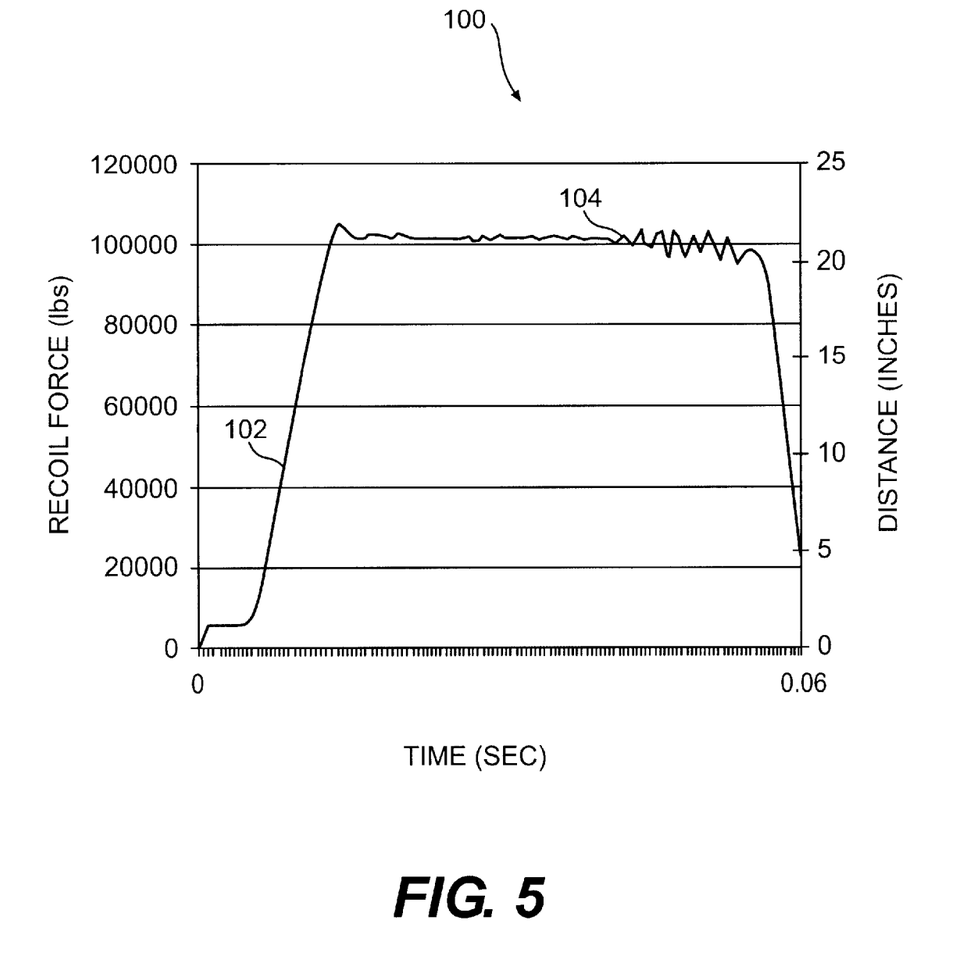
FIG. 5 is a graph illustrating an exemplary plot of a fluid force profile.

Preferably, controller 16 controls the position of shuttle valve 50 to exert a substantially constant fluid force against the motion of piston 30. As illustrated in FIG. 5, a profile 100 of the fluid force as a function of time will preferably have a substantially trapezoidal shape. As show, the fluid force will have an increasing portion 102, a substantially constant portion 104, and a decreasing portion 106.

Controller 16 may determine the magnitude of the electrical current to apply to shuttle valve control 70 based on sensed operating conditions of the weapon 10 and/or recoil mechanism 20. In the currently contemplated embodiment, the pressure of the fluid within first chamber 26 is sensed. It should be understood, however, that other operating conditions of weapon 10 and/or recoil mechanism 20 may also be sensed.

Controller 16 may obtain a substantially trapezoidal fluid force profile 100 by adjusting the size of the fluid passageway between first and second chambers 26 and 28 to maintain a substantially constant pressure within first chamber 26. During the first portion of the recoil stroke, where the recoil energy of piston 30 is high, controller 16 may apply a relatively large current to shuttle valve control 50. The relatively large current will result in a relatively strong magnetic field and a relatively large second force ($F_2$), which acts to keep shuttle valve 50 in the first position to maintain a large fluid passageway is large.

As the piston 30 continues through the recoil stroke and the pressure within first chamber 26 subsides, controller 16 may decrease the current applied to shuttle valve control 70. The decreased current deceases the strength of the magnetic field and the magnitude of the second force ($F_2$), which allows shuttle valve 50 to move towards the second position to decrease the size of the fluid passageway between first and second chambers 26 and 28. Decreasing the size of the fluid passageway will decrease the flow rate of fluid between first and second chambers 26 and 28 and maintain a substantially constant pressure within first chamber 26. In this manner, controller 16 may actively control the position of shuttle valve 50 to exert a substantially constant fluid force against piston 30 throughout the recoil travel distance.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A recoil mechanism for a weapon, comprising:
  a housing containing a hydraulic fluid and having an inner wall defining a first chamber and a second chamber within the housing, the inner wall having at least one orifice connecting the first and second chambers;
  a piston slidably disposed within the first chamber of the housing;
  a shuttle valve slidably disposed within the first chamber of the housing and having at least one orifice configured to align with the at least one orifice in the inner wall of the housing to define a fluid passageway between the first and second chambers; and
  a shuttle valve control operable to generate a magnetic field in response to an applied current to control the movement of the shuttle valve to thereby control the size of the fluid passageway between the first and second chambers;
  wherein the shuttle valve control includes a third chamber containing a rheological fluid and wherein a portion of the shuttle valve is slidably disposed in the third chamber.

2. The recoil mechanism of claim 1, wherein the shuttle valve control includes a magnetic field generating device and the rheological fluid is a magneto-rheological fluid.

3. The recoil mechanism of claim 2, wherein the magnetic field generating device is an electromagnet.

4. The recoil mechanism of claim 2, wherein the third chamber defines a first cavity adjacent a first surface of the portion of the shuttle valve, a second cavity adjacent a second surface of the portion of the shuttle valve, and a third cavity connecting the first cavity with the second cavity.

5. The recoil mechanism of claim 4, wherein the magnetic field acts on the magneto-rheological fluid to change the effective viscosity of the rheological fluid to control the movement of the portion of the shuttle valve disposed in the third chamber.

6. A recoil mechanism for a weapon, comprising:
  a housing containing a hydraulic fluid and having an inner wall defining a first chamber and a second chamber within the housing, the inner wall having at least one orifice connecting the first and second chambers;
  a piston slidably disposed within the first chamber of the housing;
  a shuttle valve slidably disposed within the first chamber of the housing and having at least one orifice configured to align with the at least one orifice in the inner wall of the housing to define a fluid passageway between the first and second chambers; and
  a shuttle valve control operable to generate a magnetic field in response to an applied current to control the movement of the shuttle valve to thereby control the size of the fluid passageway between the first and second chambers;
  wherein the shuttle valve control includes a third chamber and a portion of the shuttle valve is slidably disposed in the third chamber, and wherein the portion of the shuttle valve disposed in the third chamber includes a magnetic material and the generated magnetic field exerts a magnetic force on the portion of the shuttle valve.

7. The recoil mechanism of claim 1, wherein the shuttle valve is moveable between a first position where the at least one orifice of the shuttle valve aligns with the at least one orifice of the inner wall to maximize the size of the fluid passageway and a second position where the at least one orifice of the shuttle valve overlaps the at least one orifice of the inner wall to minimize the size of the fluid passageway.

8. The recoil mechanism of claim 7, further including a spring acting on the shuttle valve to move the shuttle valve towards the first position.

9. A recoil mechanism for a weapon, comprising:
  a housing containing a hydraulic fluid and having an inner wall defining a first chamber and a second chamber within the housing, the inner wall having at least one orifice connecting the first and second chambers;
  a piston slidably disposed within the first chamber of the housing;
  a shuttle valve slidably disposed within the first chamber of the housing and having at least one orifice configured to align with the at least one orifice in the inner wall of the housing to define a fluid passageway between the first and second chambers; and a shuttle valve control operable to generate a magnetic field in response to an applied current to control the movement of the shuttle valve to thereby control the size of the fluid passageway between the first and second chambers;

wherein the shuttle valve includes a central opening configured to receive a shaft of the piston.

10. A recoil mechanism for a weapon, comprising:

a housing containing a hydraulic fluid and having an inner wall defining a first chamber and a second chamber within the housing, the inner wall having at least one orifice connecting the first and second chambers;

a piston slidably disposed within the first chamber of the housing;

a shuttle valve slidably disposed within the first chamber of the housing and having at least one orifice configured to align with the at least one orifice in the inner wall of the housing to define a fluid passageway between the first and second chambers; and a shuttle valve control operable to generate a magnetic field in response to an applied current to control the movement of the shuttle valve to thereby control the size of the fluid passageway between the first and second chambers;

wherein the shuttle valve defines a fourth chamber within the housing and wherein the shuttle valve includes a series of openings connecting the first chamber with the fourth chamber.

11. The recoil mechanism of claim 1, wherein the piston includes a first side and a second side and the inner wall includes at least two orifices that are configured to allow fluid to flow from a portion of the first chamber adjacent the first side of the piston through the second chamber to a portion of the first chamber adjacent the second side of the piston.

12. A recoil mechanism for a weapon, comprising:

a housing containing a hydraulic fluid and having an inner wall defining a first chamber and a second chamber within the housing, the inner wall having at least one orifice connecting the first and second chambers;

a piston slidably disposed within the first chamber of the housing;

a shuttle valve slidably disposed within the first chamber of the housing and having at least one orifice configured to align with the at least one orifice in the inner wall of the housing to define a fluid passageway between the first and second chambers; and a shuttle valve control operable to generate a magnetic field in response to an applied current to control the movement of the shuttle valve to thereby control the size of the fluid passageway between the first and second chambers;

wherein a second piston is slidably disposed within the second chamber, the second piston separating the hydraulic fluid from a gas.

13. A recoil mechanism for a weapon, comprising:

a housing containing a hydraulic fluid and having an inner wall defining a first chamber and a second chamber within the housing, the inner wall having at least one orifice connecting the first and second chambers;

a piston slidably disposed within the first chamber of the housing;

a shuttle valve slidably disposed within the first chamber of the housing and having at least one orifice configured to align with the at least one orifice in the inner wall of the housing to define a fluid passageway between the first and second chambers; and a control means for generating a magnetic field to control the movement of the shuttle valve in response to an applied current to thereby control the size of the fluid passageway between the first and second chambers;

wherein the control means includes a third chamber containing a rheological fluid and a portion of the shuttle valve is slidably disposed in the third chamber.

14. The recoil mechanism of claim 13, wherein the rheological fluid is a magneto-rheological fluid and the control means includes an electromagnet.

15. The recoil mechanism of claim 14, wherein the magnetic field acts on the magneto-rheological fluid to change the effective viscosity of the magneto-rheological fluid to thereby control the movement of the shuttle valve and the size of the fluid passageway.

16. A weapon, comprising:

a support carriage;

a barrel assembly slidably disposed on the support carriage;

a sensor operable to sense at least one operating condition of the weapon; and a recoil device disposed between the support carriage and the barrel assembly, the recoil device including:

a housing containing a hydraulic fluid and having an inner wall defining a first chamber and a second chamber within the housing, the inner wall having at least one orifice connecting the first and second chambers;

a piston slidably disposed within the first chamber of the housing;

a shuttle valve slidably disposed within the first chamber of the housing and having at least one orifice configured to align with the at least one orifice in the inner wall of the housing to define a fluid passageway between the first and second chambers;

a shuttle valve control operable to generate a magnetic field in response to an applied current to govern the movement of the shuttle valve and thereby control the size of the fluid passageway between the first and second chambers; and a controller operable to apply a current to the shuttle valve control based on the at least one sensed operating condition of the weapon.

17. The weapon of claim 16, wherein the at least one operating condition is a pressure within the first chamber of the housing.

18. A weapon, comprising:

a support carriage;

a barrel assembly slidably disposed on the support carriage; and a recoil device disposed between the support carriage and the barrel assembly, the recoil device including:

a housing containing a hydraulic fluid and having an inner wall defining a first chamber and a second chamber within the housing, the inner wall having at least one orifice connecting the first and second chambers;

a piston slidably disposed within the first chamber of the housing;

a shuttle valve slidably disposed within the first chamber of the housing and having at least one orifice configured to align with the at least one orifice in the inner wall of the housing to define a fluid passageway between the first and second chambers; and a shuttle valve control operable to generate a magnetic field in response to an applied current to govern the movement of the shuttle valve and thereby control the size of the fluid passageway between the first and second chambers, wherein the shuttle valve control includes a third chamber and a portion of the shuttle valve is slidably disposed within the third chamber.

19. The weapon of claim 18, wherein the third chamber contains a rheological fluid.

20. The weapon of claim 19, wherein the shuttle valve control includes a magnetic field generating device and the rheological fluid is a magneto-rheological fluid.

21. The weapon of claim 20, wherein the magnetic field generating device includes an electro magnet.

22. The weapon of claim 20, wherein the third chamber defines a first cavity adjacent a first surface of the portion of the shuttle valve, a second cavity adjacent a second surface of the portion of the shuttle valve, and a third cavity connecting the first cavity with the second cavity.

23. The weapon of claim 22, wherein the magnetic field acts on the rheological fluid to change the effective viscosity of the rheological fluid to control the flow rate of the Theological fluid through the third cavity and thereby control the movement of the shuttle valve.

24. The weapon of claim 18, wherein the shuttle valve is moveable be first position where the at least one orifice of the shuttle valve aligns with the at least one orifice of the inner wall to maximize the size of the fluid passageway and a second position where the at least one orifice of the shuttle valve overlaps the at least one orifice of the inner wall to minimize the size of the fluid passageway.

25. The weapon of claim 24, further including a spring acting on the shuttle valve to move the shuttle valve towards the first position.

26. A weapon, comprising:
a support carriage;
a barrel assembly slidably disposed on the support carriage; and
a recoil device disposed between the support carriage and the barrel assembly, the recoil device including:
a housing containing a hydraulic fluid and having an inner wall defining a first chamber and a second chamber within the housing, the inner wall having at least one orifice connecting the first and second chambers;
a piston slidably disposed within the first chamber of the housing;
a shuttle valve slidably disposed within the first chamber of the housing and having at least one orifice configured to align with the at least one orifice in the inner wall of the housing to define a fluid passageway between the first and second chambers; and
a shuttle valve control operable to generate a magnetic field in response to an applied current to govern the movement of the shuttle valve and thereby control the size of the fluid passageway between the first and second chambers,
wherein the shuttle valve defines a fourth chamber within the housing and wherein the shuttle valve includes a series of openings connecting the first chamber with the fourth chamber.

27. The weapon of claim 26, wherein the piston includes a first side and a second side and the inner wall includes at least two orifices that are configured to allow fluid to flow from a portion of the first chamber adjacent the first side of the piston through the second chamber to a portion of the first chamber adjacent the second side of the piston.

28. A weapon, comprising:
a support carriage;
a barrel assembly slidably disposed on the support carriage; and
a recoil device disposed between the support carriage and the barrel assembly, the recoil device including:
a housing containing a hydraulic fluid and having an inner wall defining a first chamber and a second chamber within the housing, the inner wall having at least one orifice connecting the first and second chambers;
a piston slidably disposed within the first chamber of the housing;
a shuttle valve slidably disposed within the first chamber of the housing and having at least one orifice configured to align with the at least one orifice in the inner wall of the housing to define a fluid passageway between the first and second chambers;
a shuttle valve control operable to generate a magnetic field in response to an applied current to govern the movement of the shuttle valve and thereby control the size of the fluid passageway between the first and second chambers,
wherein a second piston is slidably disposed within the second chamber, the second piston separating the hydraulic fluid from a gas.

29. A method of absorbing a recoil momentum generated by a weapon, comprising:
applying a recoil momentum to a piston disposed in a first chamber of a housing;
throttling fluid pressurized by the momentum of the piston through a fluid passageway connecting the first chamber of the housing with a second chamber in the housing to exert a fluid force against the motion of the piston;
sensing an operating condition of the weapon; and
generating a magnetic field to control the motion of a shuttle valve based on the sensed operating condition, the motion of the shuttle valve varying the size of the fluid passageway between the first and second chambers to provide control over the magnitude of the fluid force exerted on the piston, wherein the magnetic field changes an effective viscosity of a rheological fluid to control the movement of the shuttle valve.

30. The method of claim 29, wherein the motion of the shuttle valve is controlled to exert a predetermined fluid force against the motion of the piston.

31. A method of absorbing a recoil momentum generated by a weapon, comprising:
applying a recoil momentum to a piston disposed in a first chamber of a housing;
throttling fluid pressurized by the momentum of the piston through a fluid passageway connecting the first chamber of the housing with a second chamber in the housing to exert a fluid force against the motion of the piston;
sensing an operating condition of the weapon; and
generating a magnetic field to control the motion of a shuttle valve based on the sensed operating condition, the motion of the shuttle valve varying the size of the fluid passageway between the first and second chambers to provide control over the magnitude of the fluid force exerted on the piston;

wherein a graph of the fluid force as a function of time has a predetermined profile.

32. The method of claim 31, wherein the predetermined profile has a substantially trapezoidal shape.

33. The method of claim 29, wherein the sensed operating condition is a pressure of the fluid in the first chamber.

* * * * *